May 25, 1954  J. A. DONDERO ET AL  2,679,640
REMOTE VALVE CONTROL AND POSITION INDICATOR SYSTEM
Filed June 22, 1949  3 Sheets-Sheet 1

INVENTORS
John A. Dondero
Herbert N. Fochs
BY
ATTORNEY

| POSITION | LINE VOLTS | LINE POLARITY | RELAYS IN | CONTACTS MAKING | VACUUM PUMPS 42' | MOTOR CLOSING 42" | MOTOR FAST OPENING 44' 43''' | COMPENSATED CONTROL 43' | DAY CONTROL 44'' 43'' | TIMER CLOSING 81 | TIMER FAST OPENING 87 | TIMER SLOW OPENING 91 |
|---|---|---|---|---|---|---|---|---|---|---|---|---|
| 1 | 0 | - | - | CLOSED VALVE, TIMER STOPPED VACUUM PUMP OFF | | X | | | | | | |
| 2 | 0 | - | - | VALVE CLOSING, TIMER ON CLOSING VACUUM PUMPS OFF | | X | | | | X | | |
| 3 | 60 | 40+ 41- | 42 | VACUUM PUMPS RUNNING, VALVE MOTOR SAME AS THE LAST SETTING | X | | | | | | | |
| 4 | 120 | 40+ 41- | 42 44 | VACUUM PUMPS RUNNING, FAST VALVE OPENING TIMER ON FAST OPENING | X | | X | | | | X | |
| 5 | 60 | 40- 41+ | 42 43 | VACUUM PUMPS RUNNING, SLOW VALVE OPENING TIMER ON SLOW OPENING | X | | | X | | | | X |
| 6 | 60 | 40- 41+ | 42 43 | VACUUM PUMPS RUNNING, COMPENSATED CONTROL | X | | | X | | | | |
| 7 | 120 | 40- 41+ | 42,43 44 | VACUUM PUMPS RUNNING, DAY CONTROL | X | | | X | X | | | |

INVENTORS
John A. Dondero
Herbert N. Fochs
BY
Norman T. Holland
ATTORNEY

Patented May 25, 1954

2,679,640

UNITED STATES PATENT OFFICE 2,679,640

REMOTE VALVE CONTROL AND POSITION INDICATOR SYSTEM

John A. Dondero and Herbert N. Fochs, New York, N. Y.

Application June 22, 1949, Serial No. 100,594

6 Claims. (Cl. 340—226)

The present invention relates to an electric circuit or system and parts therefor and more particularly to an electric circuit for controlling from a central location the operation of one or more remotely located pieces of equipment.

Since the present invention is highly useful in controlling steam heating systems utilized in large housing projects and the like, which utilize a central heating plant for supplying heat to a number of different apartment "units" or groups, it will for convenience of illustration and description be described chiefly in connection with such usage. It is to be understood, however, that its field of usefulness is not limited to control of a heating system; it may be used with various industrial plants, chemical plants, factories, dwellings, housing projects, signal and signal control installations, and the like.

In housing projects such as referred to above the central heating plant is connected by steam supply and condensate return pipes with various different apartment units to be heated. For example, it may be connected with as many as thirty or forty different apartment units. At each different apartment unit or group steam supply and condensate return pipes for that unit come to a "local" heating control room, in which are located vacuum and condensate pumps together with their driving motors, steam control valve together with a motor or other means for electrically operating it, a "selector" for measuring outside temperature, a heat balancer for measuring indoor temperature, control panel, traps, etc.

Under previous systems such as the above the heating of each of thirty or forty different apartment units has been controlled at each of the corresponding thirty or forty different local control rooms. There has been no centralized control of all the different localized control rooms from a single point. As a result an operator has had to visit each of the local control rooms to start the system, bring it up to an operating "level," periodically supervise the system and controls during localized automatic operation, and to cut off the equipment in the particular local heating control room at the end of the heating day. Usually one operator has to take care of five, six or more different local control rooms; with thirty or forty different local control rooms this means that six, eight or more operators are required in order to continually supervise the local control rooms and the heating system requirements.

For example, during the heating season the vacuum pumps for a given apartment group must generally be turned on by an operator at 5 a. m. in each local control room. At 6 a. m. the local steam valve must be opened only a limited amount and remain so for a period of time. While vacuum pumps and steam valves can be turned on by individual time clocks for each different piece of equipment this is not preferred since it lacks supervision by an operator and since it may be desired to vary these times in earlier or later directions in accordance with existing weather conditions, which would require the operator resetting and adjusting the equipment and the various time clocks.

After an elapsed time the steam valve is opened a further amount, manually only, beyond the initial position. These two steps of opening the valve are important since they reduce or eliminate steam line noises, impose a gradual load on the boilers and insure that the buildings are properly heated during the initial "heating up" period. This procedure generally requires from one and one-half to two and one-half hours, varying with outside temperatures.

After the steam valve has been opened the desired full amount, at the end of the one and one-half to two and one-half hour period, the operator then may place the system in an automatic local control condition, minor adjustments then being required from time to time throughout the heating day to maintain normal building temperatures. During the remainder of the heating day the operator periodically checks the pump operations, temperatures, et cetera at each of the local control rooms under his supervision. At the end of the heating day the operator must shut off the steam valve and pumps, either by hand or by means of a manually preset time clock control; this secures the system for the night. The above cycle must be repeated for each heating day.

It can be readily appreciated that the above procedure is time consuming and expensive, as well as inefficient at best. If operators are not prompt to start the pumps and open the steam control valves and to correct for changes in temperature or for wind conditions, there are complaints from tenants. In addition, where the operator does not do his job most efficiently there results great heat wastage and consequent fuel consumption and fuel costs.

The present invention aims to overcome the above and other difficulties or disadvantages by providing a new and improved electric circuit and controlling and indicating means by which any number of different apartment units or groups may be accurately and readily controlled from a single central location by a single operator. A further aim is the provision of a new and improved temperature indicating and alarm system which accurately shows at the single central location the steam temperature at any desired remote point of the heating system. The invention further contemplates the provision of a simplified electric circuit having minimum wiring which may be readily applied to existing housing projects or the like.

An object of the present invention is to provide a new and improved controlling and indicating circuit or device.

Another object of the invention is to provide a new and improved controlling circuit or system which employs minimum electrical wiring.

Another object is to provide a new and improved method of controlling the operation of an electric motor or other device from a remote location.

Another object of the invention is to provide a new and improved and preferably combined temperature indicating and temperature alarm device.

Another object of the invention is to provide a new and improved controlling and indicating circuit for a plurality of remotely located units, which may be operated by a single operator from a single location.

A further object of the invention is to provide a new and improved controlling and indicating circuit or device which may be readily applied to existing housing projects or the like.

A further object of the invention is to provide a control circuit or device which embodies new and improved means for accurately indicating the position of a remotely located member such as a fluid-controlling valve.

A still further object of the invention is to provide positive synchronization between control or controlling point to a local or controlled location.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

GENERAL DESCRIPTION

Figures 1, 5, 6A, 6B:
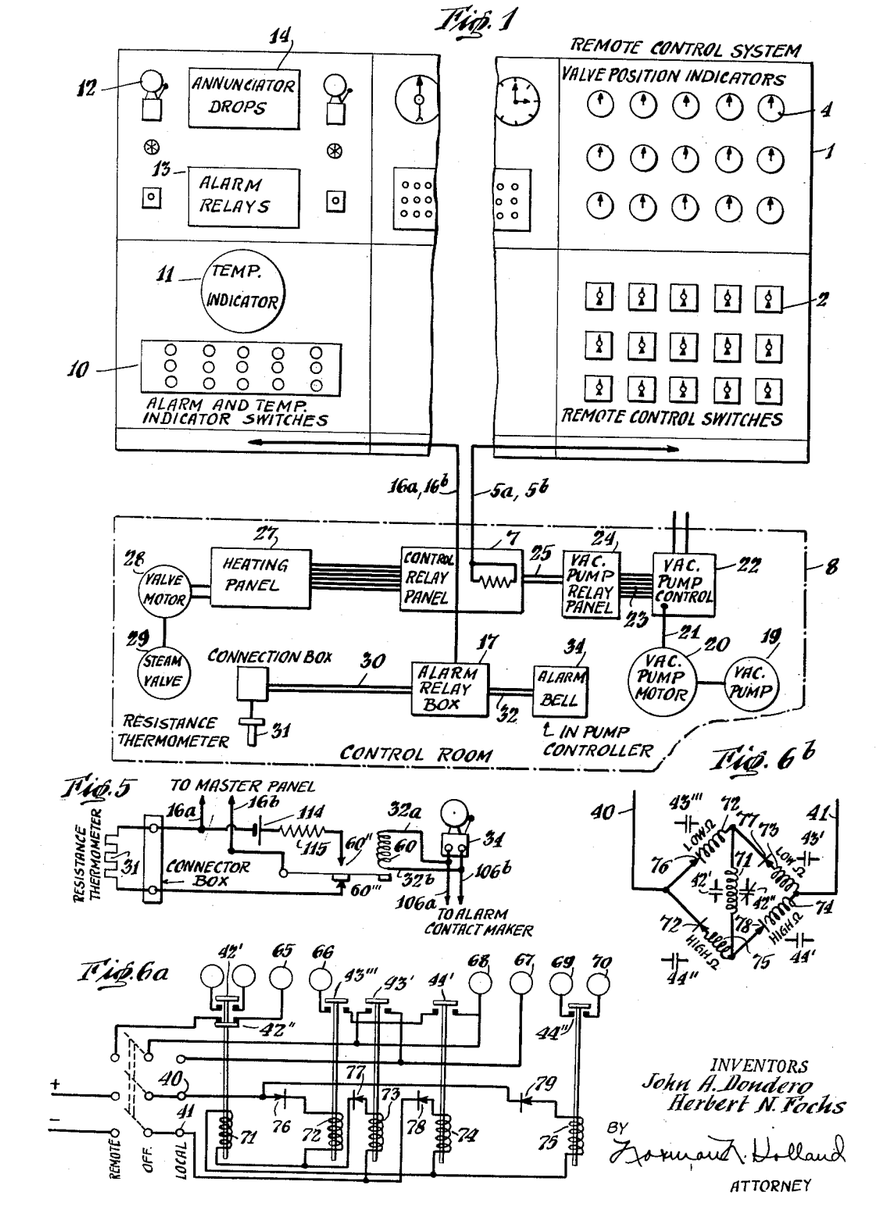
Fig. 1 is a more or less diagrammatic view showing a form of the present invention.
Fig. 5 is a wiring diagram illustrating another form of combined temperature indicating and temperature alarm circuit.
Figs. 6a and 6b are wiring diagrams showing another form of the invention.

Referring more particularly to Fig. 1 there is shown a master panel 1 located at some central position, preferably at the steam plant which generates steam supplied to the various "outlying" apartment units or groups. At the right side of the master control panel is shown a plurality of multiple position selector switches 2, one selector switch corresponding to each local control room of each apartment unit or group; as a matter of convenience in illustration and description fifteen different selector switches are shown. Each selector switch is connected by a separate pair of control conductors, 5a and 5b, with a control relay panel 7 of a local heating control room 8. Each of the selector switches has operatively connected with it a corresponding steam valve position indicator; thus when a selector switch on the master control panel is used to control a steam valve at an outlying control room the position of the particular remote steam valve is clearly indicated to the central operator.

The selector switches 2 may have any number of positions, corresponding to the requirements of the particular equipment to be controlled in a local heating control room. The selector switches may be of rotary, cam, key or any other construction whereby incoming feeder voltages and currents may be switched in various combinations to the outgoing control wires 5a, 5b which join the master panel 1 with the control relay panel 7 in a local control room 8. By utilizing the selector switch 2 to change and vary these voltages and currents, corresponding relay positions are obtained at the local control room. The particular relay positions thus obtained make and break various electrical connections and thereby control the operation of electrical parts and connected equipment. Thus by means of a selector switch corresponding to each local control room the entire heating system may be controlled from the master panel by a single operator; each local control room is controlled independently of any other. This is a highly desirable feature since apartment units or groups controlled through different remote local control rooms may be exposed to widely varying conditions of wind, and sun, which greatly affect the heating requirements therein. Contacts are also provided on each of the selector switches which through timing motors serve to indicate on the master panel the position of the steam valve at a particular local station.

Figure 4:
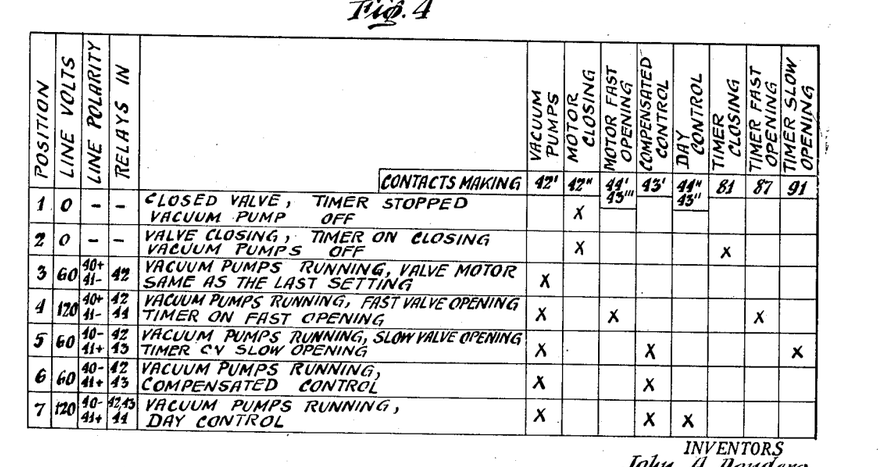
Fig. 4 is a chart illustrating the status of the apparatus or system under various operating conditions.

With the present embodiment described herein each selector switch has seven different positions, as shown in the chart of Fig. 4. There may, of course, be a greater or lesser number of positions, depending upon the particular equipment to be controlled.

At the opposite side of the master panel are shown temperature indicating-temperature alarm switches 10, a temperature indicator 11, alarm relays 12 and the annunciator drops 14 which are actuated when the temperature alarm is actuated. There is shown a separate temperature and alarm switch for each of the various outlying local control rooms 8, fifteen being shown for purposes of illustration and description. Each temperature indicating-alarm switch 10 is connected by a separate pair of conductors 16a, 16b with an alarm relay box 17 of a local control room 8.

The center portion of the master panel 1 is shown broken away to indicate that it may be of any desired size. This center part may carry various panel equipment, clocks, indicating lights, et cetera, with which the present invention is not concerned.

The equipment located at a single local control room 8 is indicated diagrammatically in Fig. 1. Only one remote local control room is shown and will be described as the others are similar in construction and operation, hence a description of one will suffice for all.

At or adjacent each of the remote local control rooms 8 is a vacuum pump 19 adapted to be driven by a vacuum pump electric motor 20 through conductors 21 from a vacuum pump control panel 22. As shown the vacuum pump control panel 22 is electrically joined by six conductors 23 with a vacuum pump relay panel 24, which panel is in turn connected with the control relay panel 7 by a pair of conductors 25. Appropriate positioning of the particular selector switch 2 for the remote control room 8 serves to actuate the relays of the control relay panel 7 and of the vacuum pump relay panel 24 as will be more fully brought out hereinafter, to thereby start and selectively control and stop the operation of the vacuum pump drive motor 20.

In addition, selectively setting a selector switch 2 at the master panel 1 also serves to actuate various relays at the control relay panel 7 and a heating control panel 27 to operate a particular motor or actuator 28 which moves the steam valve 29.

When a particular selector switch 2 is used during an initial warm up period to selectively control steam valve settings, a corresponding valve position indicator 4 is automatically cut in to visibly indicate on the master panel, either exactly or approximately, a steam valve setting. The valve position indicator 4 may comprise one or more motors $18a$, $18b$, $18c$ geared or connected by a common shaft 26 (Fig. 2) to a common pointer 3; preferably three different motors are utilized, one ($18c$) to control operation of the indicating pointer during slow opening rate of a steam valve 29, one ($18b$) to control movement of the pointer at fast opening rate of the steam valve 29, one ($18a$) to move the pointer when the steam valve 29 is moved toward closed position, the number of valve position indicators or motors depending upon the requirements for the selector and the operating needs of the particular installation. These motors are preferably of the synchronous type and measure the time that the valve is opening slowly, opening rapidly, or closing; the face of the indicator is, however, preferably calibrated in accordance with the valve itself to show the amount that the valve is open rather than being calibrated in units of time. The timing indicators may not always be in exact synchronism with the valve position, but may be only approximately so. For example, a valve may be assumed to open full in two minutes under "fast" opening or ten minutes under "slow" opening. In these instances the indicator turning through a revolution acts as a two "minute" hand in one case and as a ten "minute" hand in the other. The valve position indicator 4 is used only during periods while the master panel 1 has control and is not used during periods when the selector switch 2 is set to give automatic control of the steam valve position to equipment at a local control room.

After being brought through a heating up period by exercising control from the master panel 1 the local heating control room may be set on "day control" or "compensated control," in each of which positions the particular local control room is given local command and there exists a localized automatic control at the particular remote control room.

Figure 3:
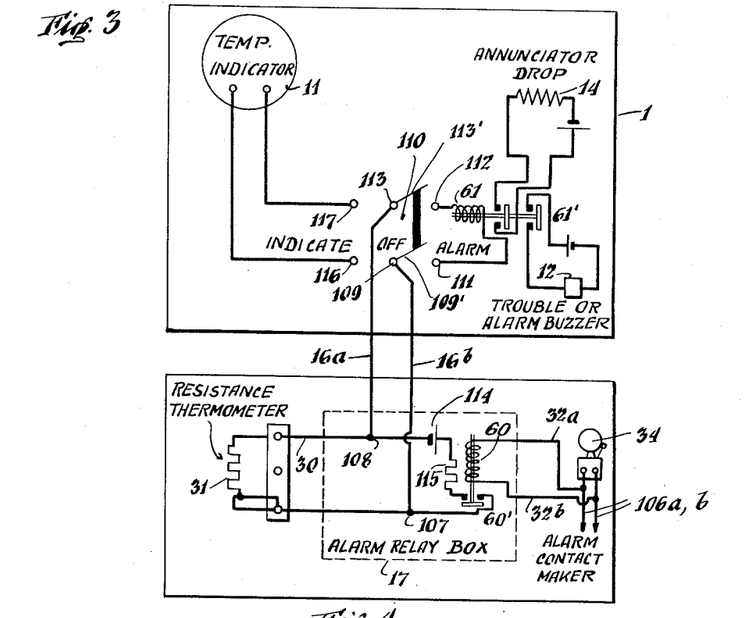
Fig. 3 is a wiring diagram showing a temperature indicating and temperature alarm portion of the present device or system.

The temperature indicating and temperature alarm switches 10 shown at the lower left portion of the master panel 1 are each connected with the temperature indicator 11, with an alarm bell or buzzer 12, and with a separate annunciator drop 14. They are also connected by the pair of conductors $16a$, $16b$ with the alarm relay box 17 in the remote local control room. This alarm relay box 17 is shown connected by a pair of conductors 30 with a resistance thermometer 31 which measures steam temperature of the heating system at or adjacent the local control room, and by a pair of conductors 32 with an alarm bell 34. The resistance thermometer temperature indicating portion of the device enables the central operator to determine the proper increments to be used during heating up periods and also tells him when to modify the local automatic control, handled at the local control room, from normal "day" operation to a "compensated" operation. This remote temperature indicating portion is highly desirable in obtaining the highest possible efficiency of the heating system. In addition, the temperature alarm system combined with the temperature indicating system over the same connecting wires, gives an indication to the central operator of mechanical or electrical failures of equipment contained in the remote control room.

There will now be described in greater detail the construction and operation of the circuits and their parts.

In one embodiment of the invention alternating current of about 120 volts is supplied through conductors to a direct current converter or rectifier and to a valve position indicator, the output side of the converter connecting with a multiple contact selector switch. The direct current converter or rectifier connected to the alternating current supply provides two direct current voltages, preferably of about 60 volts positive and 120 volts positive. Other suitable voltage values, frequencies, whether superimposed or not, may be utilized, as will be hereinafter brought out, those herein referred to being examples of those which may be employed.

Figure 2:
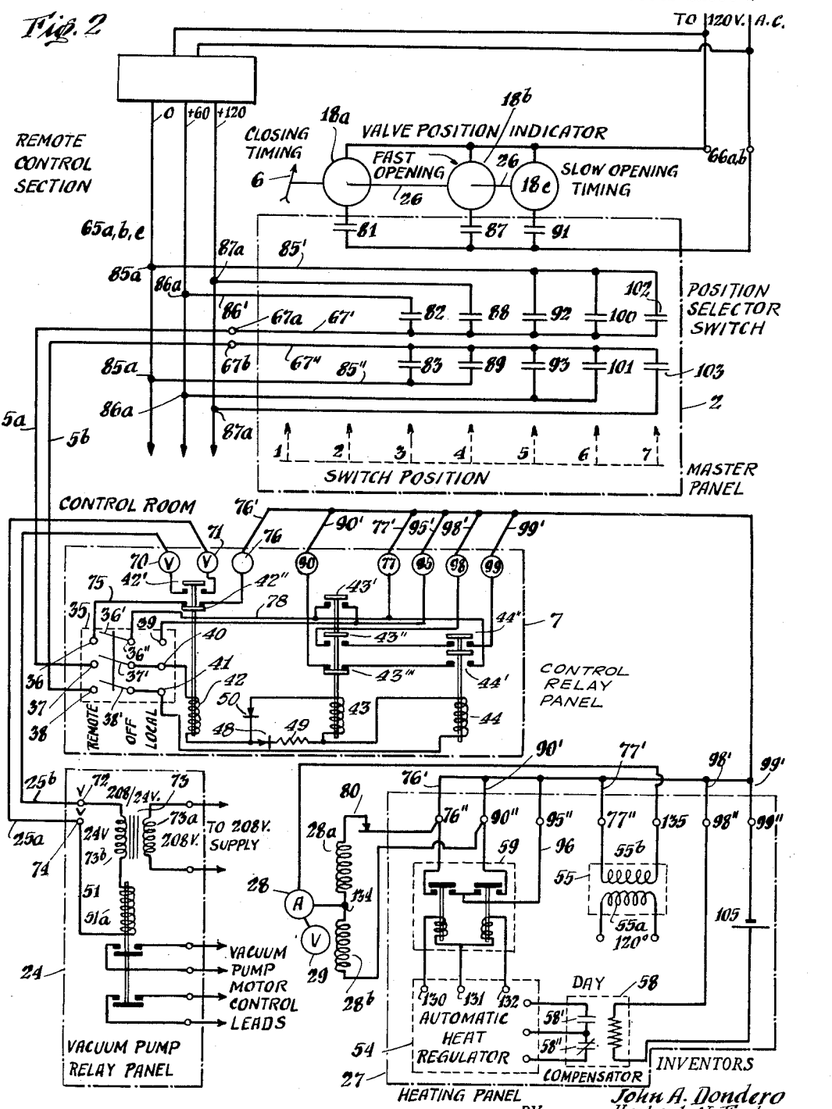
Fig. 2 is a wiring diagram for the device illustrated in Fig. 1 showing the parts in greater detail.

The local control panel controls the operation of the steam valves and vacuum pump at a local control station, through the relays 42, 43, 44 (Fig. 2). These relays may be controlled either remotely from selector switch 2 at the master panel or directly in the local heating control room. As previously brought out, each selector switch is a multiple contact switch, which in the present embodiment has six different "on" positions and one "off" position. A rotary type switch is a compact and efficient one which gives good results. The output of the position selector switch is shown coupled to the particular local control room by two conducting wires $5a$, $5b$. Instead of utilizing two conductors $5a$, $5b$ as shown, one of these conductors may be a "ground return," thereby requiring only a single wire. The input sides of the contacts of the selector switches are coupled with the 60 volt direct current and 120 volt direct current supply lines to thereby provide for different voltage conditions across the output conducting wires as indicated in the chart of Fig. 4.

*Vacuum pump relay panel*

The vacuum pump 19 is shown operated by the electric motor 20 (Fig. 1) through the vacuum pump control 22, which may be of generally known construction, and through the pump relay panel 24. This panel 24 includes (Fig. 2) a relay 51 with two contacts 52, 53 and a power transformer 73. The closing and opening of the contacts 52, 53 starts and stops the motor 20, or a number of motors, or other devices as the case may be. The primary winding 73a of the transformer 73 is shown connected to a 208 volt A. C. supply producing across the output of the secondary winding 73b a voltage of about 24 volts. The winding 51a of the relay 51 is connected in series with the secondary of the transformer and the input terminals 72, 74. When the circuit is closed across the terminals 72, 74 by contact 42' of the control relay panel 7 the voltage in the winding 73b is applied across the coil 51a of the relay and energizes the coil actuating the contacts 52, 53. The details of the circuits whereby the above devices are actuated from a selector switch 2 will be further brought out hereinafter.

Heating panel

The heating panel 27 may be of generally known construction and includes an automatic heat regulator 54, indicated generally, relays 58, 59 and a transformer 55. The automatic heat regulator automatically adjusts the steam supplied in response to the heat requirements of the building being heated; there are two types of automatic control, "day" control and "compensated" control. Automatic day control is used when weather conditions are normal and automatic compensated control is used when there are unusual weather conditions of wind, sun, et cetera. The automatic regulator may be shifted from compensated to day control by the relay 58 which has two contacts 58', and 58". When contact 58' is closed the automatic heat regulator is in day automatic control and when contact 58" is closed the regulator is in compensated automatic control. The coil 58a is shown connected in series with a voltage source 105 and output terminals 98", 99".

The relay 59 with split windings 59a, 59b and two contacts 59', 59", controls the direction of movement of the valve actuator or motor 28 when the automatic heat regulator is in charge and controlling the heating system. The winding of the relay 59 is divided into two parts by the terminal 131 connecting the center of the winding with the automatic heat regulator 54. The ends of these windings are connected to the automatic regulator through the terminals 130, 132. The winding 59a actuates contact 59' to close the steam valve and winding 59b actuates contact 59" to open the steam valve. The contact 59' is connected between terminal 76" and 95". Contact 59" is connected between terminals 95" and 90". The terminals 76" and 90" are connected to the opposite ends of the two windings 28A, 28B. The adjacent ends are connected at terminal 134 and to the secondary winding 55b of the transformer 55 through terminal 135. A limit switch may be inserted as shown between the coil 28a and terminal 76" to open the circuit when the valve is closed.

The winding 55b of the transformer 55 is connected across the terminals 135, 77". When the automatic regulator is connected, the circuit between terminals 77" and 95" is closed by contact 42" of the relay control panel. The primary winding 55a of the transformer is connected to a 120 volt A. C. source of voltage. The voltage in the secondary winding is placed across either winding 28a or 28b, depending on whether contact 59' is closed or 59" is closed. The coil 59a is energized when the opening of the steam valve is to be reduced and the winding 59b is energized when the steam valve opening is to be increased. The circuit details whereby the above referred to heating panel devices are actuated from a selector switch 2 which will be further described hereinafter.

Heating control relay panel and valve position indicators

The conductors 5a, 5b are shown connected to the relay coils of the control relay panel 7 through a triple pole, double throw switch 35, the conductors being connected to input poles 37, 38 respectively. In this embodiment the coils of the relays 42, 43, 44 are connected in series between the opposite poles 40 and 41, which poles are connected with the opposite poles 37, 38 respectively, when the switch 35 is in the "remote" position indicated in Fig. 2. The relay coil 43 is bypassed by a rectifier 48 and resistor 49 in series. A rectifier 50 is connected in series with the coil relay 43 so as to force the current through the bypass circuit when the pole 37 has a positive potential with respect to pole 38. Relay 44 may operate when 120 volts, for example, are applied across the poles 40 and 41. Relays 42 and 43 may operate when 60 volts, for example, are applied to poles 40 and 41. The remaining opposite switch poles 36 and 36" are connected to the contacts of the relays 42 and 43.

The coil of relay 42 actuates the contacts 42' and 42". On the positioning of the rotary switch 2 from the neutral or off position a positive 60 volts is applied over the lines 5a, 5b through the switch contacts 37, 38; the coil relay 42 closes the contact 42' and opens the normally closed contact 42". The contact 42' is connected to the relay 51 in the vacuum pump relay panel and closes the circuit so that the voltage from the transformer connected to the electrical system of the building is applied across the coil of relay 51, closing the contacts of the vacuum pump. The closing of contacts 52 and 53 starts the vacuum pump motor to operate the vacuum pump to and exhaust air, gases, et cetera from the heating system.

When the contact 42" is in closed position there exists a closed circuit through the closing winding 28a of the motor 28, the limit switch 80, and the transformer 55 so that the voltage is applied across the winding to actuate the valve motor 28 to thereby close the valve 29. On excitation of winding 28b the motor opens the valve 29.

The normally open contact 44' of the relay 44 is closed on the energization of the coil of relay 44 when 120 volt positive potential is applied to the terminal 40.

This completes the circuit in the heating panel so that the winding 28b is excited by current from the secondary of the transformer 55 actuating the valve motor to open the valve 29 which is connected thereto. The amount that the valve 29 is opened or closed is indicated by the corresponding valve position indicator 4 on the master control panel 1 at the central control room.

Each of the valve position indicators is shown driven by one of three different motors 18a, 18b or 18c controlled by three contacts 81, 87 or 91, respectively. When contact 81 is closed the closing timing motor 18a is energized by the 120 volt source across terminals 66a, 66b and shows the closing of the valve 29; closing contact 87 similarly energizes the fast opening motor 18b and shows the opening of the valve 29, and contact 91 energizes the slow opening motor 18c to show slow opening of the valve 29. The contacts 81, 87 and 91 are on the position selector switch 2 at positions 2, 4 and 5 (Fig. 4) corresponding to the contacts closing the valve, opening the valve rapidly, and opening the valve slowly.

The coil of relay 43 actuates the contact 43' when a negative voltage of either 60 volts or 120 volts is applied to terminal 37. With contact 43' closed the valve motor 28 is placed in control of the automatic regulator and relay 59.

The coil of relay 43 also actuates contact 43'' when a negative 120 volts is applied to terminal 37. The coil of relay 44 simultaneously actuates contact 44'' to complete the external circuit across the terminals 99'' and 93''. This shifts the operation of the automatic regulator 54 from compensated automatic control to day automatic control. Contact 93'' is also opened at this time to prevent undesired circuit closing between terminals 77' and 90'.

The operation of the present device or apparatus will now be described in connection with various conditions set up by selective positioning of the selector switches 2.

*Position 1*

As previously stated, each switch 2, which may be of the rotary type, has seven contacts; one contact is an "off" or inoperative position and the other six contacts are "operative" positions for controlling the local heating systems. In Fig. 4 the chart shows position 1 as the "off" position. The vacuum pumps are shut off and the steam valve is shut off.

In Fig. 2 the various switch positions are indicated by vertical arrows pointing toward the contacts that are closed when the switch is set at that particular position. The switch contacts connect the D. C. voltage lines 65a, 65b and 65c with the control lines 5a, 5b and also connect the valve position indicator motors across 120 volt A. C. supply lines 66a and 66b. In position 1 the D. C. lines 65a, 65b and 65c are not connected to the connecting control lines 5a, 5b so that no voltage is applied to the input terminals 37, 38 of the switch 35 at the control relay panel. Therefore there is no voltage applied to the input terminals 37, 38 and the relay coils 42, 43, 44. With no voltage across these coils the relay contacts are not actuated and are in their normal position. Contact 42' is open and the circuit is open from the terminal post 70 on the control relay panel through to the terminal 72, through the secondary of the transformer 73, the relay coil 51, the terminal post 74 and back to the terminal post 71. No current is supplied from the secondary winding 73b of the transformer 73 to the relay coil 51. Under these conditions the contacts 52 and 53 of the relay 51 are in their normal open position so that the vacuum pump motors do not operate. At the control relay panel the contact 42'' is closed completing the circuit from terminal 76 through the contact 42'', through the terminal post 36 of the switch 35, through the switch blade 36', from the terminal post 36'' along the line 78 to the output terminal post 77 of the control relay panel along line 77' to terminal 77'' of the heating panel 27, thence through the secondary 55b of the transformer 55 at the heating panel, through the limit switch 80 and the winding 28a of the two winding series motor 28 to the terminal 76'' through the wire 76' to the terminal 76. The closing of this circuit applies the voltage in the secondary 55b to the winding 28a of the motor 28 and turns the motor to move the steam valve toward closed position; when the valve is fully closed the circuit is opened by limit switch 80. This condition is a normal condition for the position 1 since it is an off position or closed down condition of the heating system. The contacts 42', 43', 43'', 44' and 44'' are in the open position and the respective circuits are open.

*Position 2*

When the selector switch is set at position 2 the electrical circuit arrangement of the local control relay panel and heating panel are the same as in the position 1. The voltages on the lines 65a, 65b, 65c are not applied to the output terminals 67a, 67b or lines 5a, 5b since there are no contacts to connect them. This position is used to shut the heating system down. The limit switch 80 is closed since the steam valve 29 is still open. The position of the steam valve is indicated by the valve position indicator. This pointer of this indicator is actuated by the closing of the contact 81 when the switch is placed in position 2. This is the only contact of the selector switch that is closed when it is placed in this position. The current from the 120 volt A. C. supply then passes through the completed circuit from the terminal 66a through the timing motor 18a, the closed contact 81 to the terminal 66b.

*Position 3*

In position 3 of the selector switch the vacuum pump motors 20 are started preparatory to admitting the steam, and the steam valve closing circuit is opened. The contacts 82, 83 of the position selector switch are closed completing the circuit from the input terminal 86a to the input terminal 85a to apply a positive 60 volt to the control relay panel. The circuit is completed from terminal 86a on the 60 volt D. C. line 65b along line 86' through the contact 82 to the output terminal 67a; thence along the control line 5a to the input terminal 37 of the switch 35, through the switch blade 37', the terminal 40 to the coil of the relay 42, thence through the rectifier 48 and the resistor 49 and the coil of relay 44 to the terminal 41; thence through the switch blade 38', the output terminal 38 and the line 5b to the input terminal 67b; and finally through the closed contact 83 along line 85'' to the input terminal 85a connected to the ground line 65a.

The voltage across the coil of relay 42 opens the contact 42'' and closes the contact 42'. The closing of contact 42' closes the vacuum pump relay circuit from terminal 70 through the contact 42', to the terminal 71, through line 25a to the terminal 74, through the coil of the relay 51, the secondary 73b of the transformer 73 to the terminal 72 through the line 25b to the terminal 70.

The current produced by the voltage in secondary winding 73b passes through the coil of relay 51 to close the contacts 52, 53 of the vacuum pump motor to start the vacuum pump running.

With the opening of the contact 42'' the circuit is broken from the terminal 76 through line 75 to the terminal 36 of the switch 35, the switch blade 36', the terminal 36'' through line 78 to the terminal 77, thence through the connecting line 77', the terminal 77'' to the secondary winding 55b from the terminal 135 through the winding 28a of the motor 28 and the limit switch 80, to the terminal 76'' back to terminal 76 and the winding 28a cannot be excited by current from the secondary 55b. The valve motor will remain in the position that it is set at when the selector switch is on position 3. The other relay contacts 43', 43'', 44' and 44'' remain open. Contact 43''' is closed but does not complete a circuit since contact 44' is still open.

Position 4

In the fourth or "fast opening" position of the selector switch the contacts 87, 88, 89 are closed. Contact 87 connects the fast opening indicator motor to the output terminals 66a, 66b and starts the valve motor 28 running.

Upon closing of the contacts 88, 89 the circuit is completed from the terminal 87a on the 120 volt line 65c, through the contact 85 to the terminal 67a, control line 5a to the terminal 37, switch blade 37', terminal 40, coil of relay 42, rectifier 48, resistor 49, coil of relay 44 to the terminal 41 thence through the switch blade 38', terminal 38, line 5b, terminal 67b, contact 89 to terminal 85a on line 65a. This places 120 volts across the terminals 40, 41. Current flows through the circuit comprising the coil of relay 42, rectifier 48, resistor 49 and coil of relay 44. The contacts 42' and 42'' remain in the same position as position 3. The coil of relay 44 is energized sufficiently to close contact 44'. The circuit is completed from terminal 90 through contacts 44' and 43''', terminal 77, line 77', to terminal 77'' to secondary winding 55b, and the winding 28b of the motor 28 to the terminal 90'' through line 90' back to terminal 90. The current then supplied by the voltage of the secondary winding passes through the completed circuit to energize winding 28b. The valve motor then starts to open the steam valve 29 with the fast opening timer motor in synchronism with the valve opening to indicate the valve position. The remaining circuits are open rendering the relays inactive.

Position 5

In position 5 the contacts 91, 92, 93 are closed. This sets the relays and circuits for slow opening of the steam valve. The closing of contact 91 completes the circuit from the 120 volt A. C. supply terminal 65a through the slow opening timer motor, the closed contact 91 to the terminal 66b.

The circuit to the control relay panel 7 is completed from the input terminal 85a through line 85', closed contact 92, line 67' to terminal 67a, thence through the connecting control wire 5a to the input terminal 37, across the switch blade 37' to the terminal 40, then through the coil of relay 42, rectifier 50, coils of relay 43 and 44, back to the terminal 41, across the switch blade 38' to the terminal 38, then along the line 5b across the terminal 67b on the switch 2, along line 67'' in the switch and through the switch 93 to the terminal 86a on the positive 60 volt line. Under this circuit arrangement the terminal 37 of the switch 35 is 60 volt negative with respect to terminal 38, or terminal 38 can be considered to be 60 volt positive with respect to terminal 37. This voltage across these terminals is the reverse of that in the case of positions 2, 3 and 4. As a result the voltages across the coils of the relays are opposite in polarity to the voltages across the relays when the selector switch 2 is in position 3 or 4.

Under these conditions the contact 42' is still retained closed and contact 42'' retained open, as when the switch is in position 3 or 4, the contact 44' is open and the circuit is open between terminals 90'' and 77''; that is, the circuit from terminal 77'', line 77', terminal 77 through the contact 44' and 42''' to terminal 90, line 90' to terminal 90'' is open.

Voltage is applied to the "opening" winding 28b of the valve motor from the secondary winding 55b upon the closing of contact 43' by the relay 43. This completes the circuit from terminal 77' through line 77 to terminal 77 through contact 43' to terminal 95, along the line 95' to terminal 95''. The external circuit between terminals 77'' and 95'' of the heating panel is then complete. At the heating panel 27 the circuit is completed along line 96 through contact 59'', which is closed due to temperature differences, through the winding 28b of the motor 28, through the secondary winding 55b of the transformer 55 to the terminal 77''. The circuit thus completed, the voltage on the secondary winding 55b is applied across the motor winding 28b and opens the valve 29 slowly. The contact 59'' is under control of the relay 59 in the automatic regulator, which may intermittently open and close the contact 59'' so that the motor 28 and valve 29 are actuated for a short period and then idle for a period. Thus the valve may be slowly opened by increments.

As previously brought out the automatic regulator has a "day" control and a "compensated" control. Normally the automatic regulator is under compensated control since the contact 58'' is closed when the circuit including the coil of relay 58 is open. In position 5 the relays 43 and 44 controlling this circuit do not close the contacts 43'' and 44''. Therefore the circuit portion between terminals 98'', 99'' is open. The control of contact 59'' is under compensated control as indicated in Fig. 4.

Position 6

In position 6 the circuit arrangements are the same except that contact 91 is open, breaking the circuit connecting the slow timing motor to the 120 volt supply at terminals 66a, 66b. In this position the valve 29 is at a desired general position but is subject to minor changes, depending upon heat demands and weather conditions. In operating under these more or less steady conditions either contact 59' or 59'' is closed by relay 59, opening or closing the steam valve, or both may be opened, leaving the valve in a set position. This is operation under "compensated" control.

Position 7

In position 7 the contacts 102 and 103 are closed completing the circuit from the terminal 85a through the switch 102 along the lines 67' to terminal 67a, thence along line 5a to terminal 37, through switch blade 37' to terminal 40, from terminal 40 through the coil of relay 42, rectifier 50, coils of relay 43 and 44 back to the terminal 41, thence through switch blade 38', terminal 38, along line 5b to terminal 67b, from terminal 67b along line 67'' through the closed contact 103 to the terminal 87a on the positive 120 volt line 65c. With this circuit completed 120 volts is placed across the coils of the relays and has the same polarity as the voltages of positions 5 and 6. The contact 42' is closed and 42'' is open. The contact 43' is closed, completing the circuit as previously described in connection with positions 5 and 6. The circuit arrangement is the same as position 6, except that the coil of relay 43 and 44 closes the contacts 43'' and 44'' respectively, completing the circuit from the terminal 98'', line 98', terminal 98 through the closed contact 43'', 44'' to the terminal 99 through the line 99' to the terminal 99″ through the battery or voltage source 105, the coil of relay 58 to the terminal 98″. With this circuit closed or completed the battery or voltage source 105 energizes the coil 58 which closes contact 58′ and opens contact 58″. This shifts the automatic regulator from "compensated" control to "day" control. The opening and closing of contacts 59′ and 59″ of the relay 59 will be then under the control of the day mechanism in the automatic regulator. The valve 29 will then be open or closed depending upon whether contact 59′ is closed or 59″ is closed. If 59′ is closed and 59″ is open the voltage of the secondary winding 55b will be applied across the coil 28a of the motor 28 to close the valve. If 59″ is closed and 59′ is open the valve motor will be actuated to open the valve. If 59′ and 59″ are both open the valve will remain in position.

Disconnection from central control station

The switch 35 at the local control relay panel has three positions, a remote position, off position, and a local position. In the remote position the switch connects the control relay panel 7 to a position selector switch 2. In the above discussion of the various circuit arrangements the switch is in the remote position.

In the local position the switch blades 36′, 37′, 38′ are connected to the terminals 39, 40, 41. This change does not alter the circuit arrangement of the relays 42, 43, 44, it only renders the relays inactive. They cannot control the opening and closing of contacts 42′, 42″, 44′a, 44′b, 43″ and 44″. The switch blade 36′ is in contact with the terminal 39 of the switch 35 and completes the circuit between terminals 77″ and 95″ on the heating panel to place the automatic regulator in control of the adjustment of the steam valve. The external circuit is completed from terminal 77″, line 77′, terminal 77, to terminal 36″, through switch blade 36′ to terminal 39, thence to terminal 95, line 95′ to terminal 95″.

In the "off" position the switch blades are not in contact with the terminals 36, 37, 38 of the remote position or terminals 39, 40, 41 of the local position. With the contact between the terminal 39 and the switch blade 36′ broken or open the automatic regulator no longer controls the adjustment of the steam valve. This position would be used when it is desired to leave the steam valve at some particular setting.

Alarm-temperature indicator

During the initial heating up period and control of the steam valve and vacuum pump motor from the central master panel location it is highly desirable to transmit to the central control location the steam temperature at or adjacent the local control room and also to notify the central operator or any failures or defects in the system. This may be achieved by the combined alarm and temperature indicating system, shown at the left of the master panel and in Fig. 3, which is provided with a switch at the master panel to transfer the system from a temperature indicating condition to an alarm condition, and vice versa. Normally the switch will be in the alarm condition except when it is desired to ascertain the temperature at the remote location.

The alarm circuit is connected to the heating system and operating parts to indicate any failure or unusual or dangerous conditions that need attention. The alarm transmission circuit is shown in Fig. 3 with the coil of relay 60 and the local alarm bell connected in parallel to the output of the alarm circuit. The local alarm bell will sound in the particular local control room when any unusual conditions are indicated by the alarm circuit, and the relay 60 actuates the contact 60′ closing the alarm relay circuit to the master control panel. The voltage source 114 which may be a one and one-half volt battery in series with a 20,000 ohm resistor 115 actuates relay 61 and contact 61′. This closes the circuit of the alarm buzzer at the master control panel and the circuit of the visual annunciator drop to provide both an aural and visual notification of unusual and undesirable conditions at the remote location.

The connecting cable 16a, 16b is also connected to the resistance thermometer 31 located in the heating system, and transmits to the temperature indicator changes in the resistance thermometer 31. The temperature indicator is a meter which indicates resistance in terms of temperature and any change in the resistance of the thermometer 31 is shown by the temperature indicator.

Considering in detail the alarm and temperature indicating circuits at the alarm relay and temperature indicating panel at the local control room the alarm bell and indicating circuits are connected to an alarm contact maker by lines 106a, 106b. When the contact is closed in the contact maker the circuit is completed through the lines 106a, 106b to sound the bell 34 at the local control room. It also completes the circuit through line 32a, relay 60 and line 32b. The relay is energized by the voltage at the contact maker source closing the contact 60′. This completes a circuit through terminal 107, line 16b, terminal 108 of switch 110 through the switch knife 109′ to the terminal 111 through the coil of the relay 61 to the terminal 112 through the switch blade 113′ terminal 113 to the line 16a, back to the terminal 108 at the alarm relay panel at the local control room to the voltage source 114 and thence through the resistor 115 back to the closed contact 60′. The voltage from the voltage source 114 is then applied across the relay 61 to close the contacts 61′ to thereby energize the buzzer 12 and annunciator drop 14. With the closing of the contact 60′ the sound circuit is also completed through the resistance thermometer 31 but this resistance does not affect the operation of the relay 61.

If a temperature reading is desired the switch 110 is disconnected from terminals 111 and 112 and connected to terminal 116 and 117. This then completes a circuit through resistance thermometer 31, terminal 107, line 16b, terminal 108, switch blade 109′, terminal 116 through the temperature indicator to terminal 117, through the switch blade 113′ terminal 113, line 16a to terminal 108 and thence to resistance thermometer 31. With the closing of this switch, the circuit of the resistance thermometer is then closed, and the temperature of the resistance 31 will be measured by the temperature indicator 11. The circuit through the voltage source 114 and resistor 115 is incomplete since the contact 60′ is open. In the event that contact 60′ closed to indicate an alarm while the switch 110 is in contact with the terminals 117, 116, the current supplied by the voltage source 114 through resistor 115, closed contact 60′, terminal 107, line 16b, terminal 108, switch blade 109′, terminal 116, through the indicator 11, terminal 117, switch blade 113', terminal 113, line 16a, terminal 108 to the voltage source 114 is not large enough to produce any injury to the temperature indicator meter.

The temperature indicating means serves as a guide when positions 1 and 3 (Fig. 4) are used for manually operating a steam valve in increments for setting and holding heating steam line temperatures. In the other positions the temperature indicator is used for remote indication of heating system steam input as required by weather and wind conditions; also for ascertaining proper or improper functioning of heating system equipment.

In Fig. 5 there is shown another form of circuit arrangement for the alarm relay and resistance thermometer at the local control room. The single contact 60' of the relay 60 is replaced by a double-acting contact with contacts 60'' and 60'''. The normal position of the armature of the relay 60 is in contact with 60'''. This places the resistance thermometer 31 across the conductors of the cable 16. When an alarm occurs the coil of relay 60 actuates the armature and brings it in contact with 60' closing the alarm circuit to the master control panel. Thus the resistance thermometer is isolated upon the sounding of an alarm.

*Modified form of control system*

In Figs. 6a and 6b an arrangement of five relays 71, 72, 73, 74, 75 in the local control panel is shown in the form of a four sided bridge, a relay in each side of the bridge and the relay in the diagonal. The relays 72, 73, 74, 75 in the sides have rectifiers 76, 77, 78, 79 respectively connected in series with the relays. These rectifiers are connected so that when terminal 40 is positive with respect to terminal 41 the current passes through relays 72, 71 and 74 and when terminal 40 is negative with respect to terminal 41 the current passes through relays 73, 71, 75. Relays 72—71 operate when terminal 40 is at 60 volts positive potential and relays 75—71 operate when terminal 40 is at 60 volts negative potential. The relays 72, 71, 74 operate when terminal 40 is at 120 volts positive potential and relays 73, 71, 75 operate when terminal 41 is at 120 volts positive potential.

The relay contacts are the same as the ones in Fig. 2. Contacts 42' and 42'' are operated by relay 71. Contact 43''' is operated by relay 72, contact 43' by relay 73, contact 44' by relay 74, and contact 44'' by relay 75. If direct current voltages are applied to terminals 40, 41 in accordance with the chart of Fig. 4 similar operational results will be attained. When the selector switch 2 is in position 1 or 2 there is no voltage applied to the terminals 40, 41 and the coils of the relays are not energized and the contacts are in their normal position. When terminal 40 is 60 volts positive with respect to terminal 41 in position 3 of the selector switch the coils of relays 72, 71 are energized sufficiently to actuate contacts 42'', 42', 43'''. In position 4 the selector switch applies a positive 120 volts to terminal 40 and the coils of relays 71, 72, 74 are energized sufficiently to actuate contacts 42', 42'', 43''' and 44'. In positions 5 and 6 the terminal 40 is a 60 volt negative with respect to terminal 41 energizing the coils of relays 73, 71 actuating contacts 42', 42'', 43'. In position 7 the selector switch 2 applies 120 volts negative to the terminals 40, 41 and relays 73, 71, 75 are energized sufficiently to actuate contacts 42', 42'', 43' and 44''.

Additional contact combinations are available for system modifications and variations by applying 60 or other cycle alternating voltages, to the terminals 40, 41 of the circuit shown in Figs. 6a, 6b. In one of these modifications the 60 cycle, 60 volt alternating positive and negative pulses may be applied to terminals 40, 41 to energize relay coils 71, 72, 73 thereby actuating contacts 42', 42'', 43', 43'''. All of the relays 71, 72, 73, 74, 75 may be energized by 120 volt positive and negative alternating voltage pulses being applied to terminals 40, 41. The application of 120 volt positive alternating current or pulses and 60 volt negative alternating current or pulses to the terminals 40, 41 actuates relays 71, 72, 73, 75 and the contacts 42', 42'', 43', 43''', and 44''. The application of 60 volt positive alternating current or pulses and 120 volt negative alternating current or pulses actuates the relays 71, 72, 73, 74 and contacts 42', 42'', 43', 43''', 44'. From this description it is readily seen that with variations in the system circuits different contact combinations may be attained by the application of alternating current or pulses to the control system.

It will be clear that other suitable voltages may be utilized; for example, voltages such as 12 and 24 or 120 and 240, whether alternating or direct current, 60 cycles or otherwise, and that certain currents and frequencies may be superimposed upon each other. The particular combination utilized may depend upon the desires and operating requirements of a given installation.

It will be seen that the herein described remote control apparatus or device provides for controlling a heating system or the like from a remote location by using only four wires or conductors, two conductors transmitting controlling signals and two conductors transmitting intelligence signals. Ground returns may be utilized where desired and suitable. With the use of only two control conductors and three relays at the control panel all the operating conditions at the heating system may be made or "set up." Vacuum pumps may be turned on for any desired length of time before steam is admitted by the steam valve and they may be kept running during closing or opening of the steam valve and also during automatic control of the steam valve. The steam valve motor may be actuated to open the steam valve quickly or slowly during the initial heating up period or it may be placed under the control of an automatic circuit for adjustment of the valve in response to temperature changes. Control may be from the central station or may be readily turned over to the particular local station. The device is relatively simple in construction and operation and is adapted to operate over long periods with a minimum of attention or maintenance.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. Apparatus for remotely controlling a vacuum pump motor and a steam valve motor of a heating system from a central location comprising the combination with a direct current source of voltage having first and second voltages of different values, of first, second and third relays, a multiple contact switch at said central location for applying said voltages to said relays in different combinations, a first rectifier operatively between said first and said second relays and a second rectifier and impedance in series around said first rectifier and said second relay for conducting current in an opposite sense to current passing through said first rectifier and said second relay, said first relay being adapted to start a vacuum pump motor of said heating system on the application of a first voltage combination, said second relay being adapted to transfer control of said heating system to an automatic control upon the application of a different voltage combination, and said third relay being adapted to control said steam valve motor upon application of another voltage combination and also to transfer control of said heating system to automatic control.

2. A device of the class described for remotely controlling a motor-operated valve, comprising the combination of means connected with said valve operating motor for starting and stopping the motor, selectively settable means including a multiple contact switch having a bank of contacts for actuating said starting and stopping means and connected to said starting means by only two lines, and indicating means actuable by another bank of contacts to synchronously turn said indicating means with said valve motor to indicate the approximate position of said valve, said indicating means including a first electric motor for moving an indicator to show approximate valve closing positions and a second electric motor for moving an indicator to show approximate valve slow opening positions, and a third electric motor for moving an indicator to show approximate valve fast opening positions.

3. A device of the class described for remotely controlling a motor-operated valve, comprising the combination of means connected with said valve operating motor for starting and stopping the motor, selectively settable means including a multiple contact switch having a bank of contacts for actuating said starting and stopping means and connected to said starting means by only two lines, and indicating means actuable by another bank of contacts to synchronously turn said indicating means with said valve motor to indicate the approximate position of said valve, said indicating means including a first electric motor for moving an indicator to show approximate valve closing positions and a second electric motor for moving said indicator to show approximate valve slow opening positions and a third electric motor for moving said indicator to show approximate valve fast opening positions, said indicator and each of said electric motors being connected with a common shaft.

4. Apparatus as claimed in claim 1 wherein means are provided for connecting said motor to a power source, and said first relay has a closed contact in series with said motor and said connecting means to complete the connection of said motor to said connecting means for operating said motor to close a valve when no signal is impressed on said relays.

5. Apparatus for remotely controlling first and second electric motors from a central location comprising the combination with a direct current source of voltage having first and second voltages of different values, of first, second and third relays, a multiple contact switch at said central location for applying said voltages to said relays in different combinations, a first rectifier operatively between said first and said second relays and a second rectifier and impedance in series around said first rectifier and said second relay for conducting current in an opposite sense to correct passing through said first rectifier and said second relay, said first relay being adapted to start said first motor on the application of a first voltage combination, said second relay being adapted to transfer control of said first and second motors to local control upon the application of a different voltage combination, and said third relay being adapted to control said second motor upon the application of another voltage combination and also to transfer control of said first and second motor to local control.

6. Apparatus for controlling a vacuum pump motor and a steam valve motor of a heating system from a remote location comprising the combination with a direct current source of voltage having a first voltage and a second voltage different in value from said first voltage, of multiple contact switch means connected with said current source and providing at an output side of said switch means a plurality of combinations of different voltages at different values and polarities, a plurality of relays, two control lines electrically connecting said switch means with said relays said vacuum pump motor and said steam valve motor, said relays selectively controlling said motors in response to different voltage combinations selectively set at the output side of said switch means, said plurality of relays comprising two unidirectional low voltage relays connected in series and in opposition to one another, two unidirectional high voltage relays connected in series and in opposition to one another, said series low voltage relays and said series high voltage relays being connected in parallel forming a four-sided bridge circuit with low voltage relays and high voltage relays conducting current in the same direction being on opposite legs of the bridge, a bi-directional diagonal low voltage relay connected at one end between said low voltage relays and at the other end between said high voltage relays to pass current in both directions depending on the polarity of the impressed signal, said relays responding in different combinations depending on the polarity and magnitude of the voltage selected.

References Cited in the file of this patent

UNITED STATES PATENTS

| Number | Name | Date |
| --- | --- | --- |
| 767,492 | McCaughey | Aug. 16, 1904 |
| 843,746 | Hall | Feb. 12, 1907 |
| 1,614,192 | Ewald | Jan. 11, 1927 |
| 1,704,736 | Geiger | Mar. 12, 1929 |
| 1,868,523 | De Florez | July 26, 1932 |
| 1,944,326 | Hudson | Jan. 23, 1934 |
| 1,988,841 | Hayward et al. | Jan. 22, 1935 |
| 2,216,102 | Scherbak | Sept. 24, 1940 |
| 2,321,699 | O'Brien | June 15, 1943 |
| 2,347,523 | Suksdorf | Apr. 25, 1944 |
| 2,363,061 | Harrington | Nov. 21, 1944 |
| 2,368,937 | McGillin et al. | Feb. 6, 1945 |
| 2,384,167 | Harrington et al. | Sept. 4, 1945 |
| 2,389,204 | Ludi et al. | Nov. 20, 1945 |
| 2,512,639 | Gohorel | June 27, 1950 |
| 2,559,339 | Blease et al. | July 3, 1951 |

FOREIGN PATENTS

| Number | Country | Date |
| --- | --- | --- |
| 314,112 | Great Britain | June 24, 1929 |